United States Patent
Mumper et al.

(10) Patent No.: US 6,855,270 B2
(45) Date of Patent: Feb. 15, 2005

(54) NANOSCINTILLATION SYSTEMS FOR AQUEOUS-BASED LIQUID SCINTILLATION COUNTING

(75) Inventors: Russell J. Mumper, Lexington, KY (US); Michael Jay, Lexington, KY (US)

(73) Assignee: The University of Kentucky Research Foundation, Lexington, KY (US)

( * ) Notice: Subject to any disclaimer, the term of this patent is extended or adjusted under 35 U.S.C. 154(b) by 25 days.

(21) Appl. No.: 10/165,201

(22) Filed: Jun. 6, 2002

(65) Prior Publication Data

US 2004/0178388 A1 Sep. 16, 2004

Related U.S. Application Data

(60) Provisional application No. 60/296,124, filed on Jun. 7, 2001.

(51) Int. Cl.[7] ............................................. C09K 11/02
(52) U.S. Cl. .............. 252/301.17; 250/364; 250/361 R; 250/483.1; 252/646; 252/644; 252/645
(58) Field of Search ........................... 252/301.17, 646, 252/644, 645; 250/364, 361 R, 483.1

(56) References Cited

U.S. PATENT DOCUMENTS

| | | | |
|---|---|---|---|
| 3,736,524 A | 5/1973 | Drexhage | 331/94.5 |
| 3,928,227 A | 12/1975 | Sena et al. | 252/301.2 |
| 3,939,094 A | 2/1976 | Kauffman | 252/301.2 |
| 4,124,527 A | 11/1978 | Kauffman | 252/408 |
| 4,127,499 A | 11/1978 | Chen et al. | 252/301.17 |
| 4,358,401 A | 11/1982 | O'Brien et al. | 588/8 |
| 4,522,742 A | 6/1985 | Lee et al. | 252/301.16 |
| 4,588,698 A | 5/1986 | Gruner et al. | 436/535 |
| 4,624,799 A | 11/1986 | Hegge et al. | 252/301.17 |
| 4,710,319 A | 12/1987 | Lee et al. | 252/646 |
| 5,250,236 A | 10/1993 | Gasco | 264/4.4 |
| 5,298,197 A | 3/1994 | Thompson | 252/700 |
| 5,410,155 A | 4/1995 | Thomson et al. | 250/364 |
| 5,503,781 A | 4/1996 | Sumii et al. | 264/4.7 |
| 5,512,753 A | 4/1996 | Thomson et al. | 250/361 |
| 5,726,456 A | 3/1998 | Lupton et al. | 252/182.21 |
| 5,879,715 A | 3/1999 | Higgins et al. | 424/489 |

FOREIGN PATENT DOCUMENTS

| | | |
|---|---|---|
| DE | 2854959 | 6/1979 |
| EP | 0433094 | 6/1991 |
| WO | WO 01/78689 | 10/2001 |

OTHER PUBLICATIONS

Bargoni et al., "Solid lipid nanoparticles in lymph and plasma after duodenal administration to rats," *Pharmaceutical Research*, 15:745–750, 1998.

Cavalli et al., "Study by X-ray powder diffraction and differential scanning calorimetry of two model drugs, phenothiazine and nifedipine, incorporated into lipid nanoparticles," *Eur. J. Pharm. Biopharm.*, 41(5):329–333, 1995.

Cavalli et al., "The effect of the components of microemulsions on both size and crystalline structure of solid lipid nanoparticles (SLN) containing a series of model molecules," *Pharmazie*, 53(6):392–396, 1998.

De and Hoffman, "An ophthalmic formulation of a Beta-adrenoceptor anatgonist, levobetaxolol, using Poly(acrylic acid) nanoparticles as carrier: loading and release studies," *Journal of Bioactive and Compatible Polymers*, 16:20–31, 2001.

(List continued on next page.)

*Primary Examiner*—C. Melissa Koslow
(74) *Attorney, Agent, or Firm*—Fulbright & Jaworski LLP

(57) ABSTRACT

The present invention relates to the use of nanoscintillation systems, or nanoparticles containing fluor molecules, that can be used to detect an electron-emitting or alpha-particle-emitting radioisotope in the absence of organic-solvents commonly used in organic-based liquid scintillation cocktails. The invention also relates to compositions and use of three oil-in-water microemulsion precursors that can be engineered rapidly, reproducibly, and cost-effectively to produce useful nanoparticles less than 100 nanometers.

40 Claims, 6 Drawing Sheets

OTHER PUBLICATIONS

Morel et al., "Thymopentin in solid lipid nanoparticles," *International J. of Pharmaceutics,* 132:259–261, 1996.

Sharma et al., "Novel taxol formulation: polyvinylpyrrolidone nanoparticle–encapsulated taxol for drug delivery in cancer therapy," *Oncology Research,* 8(7/8):281–286, 1996.

Ugazio et al., "Incorporation of cyclosporin A in solid lipid nanoparticles (SLN)," *International J. of Pharmaceutics,* 241:341–344, 2002.

Utreja et al., "Lipoprotein–mimicking biovectorized systems for methotrexate delivery," *Pharmaceutica Acta Helvetiae,* 73:275–279, 1999.

Agostiano et al., "Synthesis and structural characterisation of CdS nanoparticles prepared in a four–components "water–in–oil" microemulsion," *Micron,* 31:253–258, 2000.

Attwood, "Microemulsions," In: *Colloidal Drug Delivery Systems,* Kreuter (ed.), 31–71, 1994.

Bhargava et al., "Using microemulsions for drug delivery," *Pharm. Tech.,* 46–53, 1987.

Bocca et al., "Phagocytic uptake of fluorescent stealth and non–stealth solid lipid nanoparticles," *International Journal of Pharmaceutics,* 175:185–193, 1998.

Capek, "Microemulsion polymerization of styrene in the presence of anionic emulsifier," *Advances in Colloid and Interface Science,* 82: 253–273, 1999.

Cavalli et al., "Solid lipid nanoparticles as carriers of hydrocortisone and progesterone complexes with cyclodextrins," *International Journal of Pharmaceutics,* 182:59–69, 1999.

Constantinides, "Lipid microemulsions for improving drug dissolution and oral absorption: physical and biopharmaceutical aspects," *Pharm. Res.,* 12:1561–1572, 1995.

Ewer and Harding, "Micellar scintillators: A rational approach to the design of stable assay solvents for liquid scintillation counting," In: *Liquid Scintillation Counting.* vol. 3. Crook and Johnson (eds.), Heyden & Son. London, pp. 220–233, 1974.

Fang et al., "Nanocrystalline bismuth synthesized via an in situ polymerization microemulsion process," *Materials Letters,* 42:113–120, 2000.

Goddu et al., "Spectrophotometric determination of esters and anhydrides by hydroxamic acid reaction," *Anal. Chem.,* 27:1251–1255, 1955.

Harrah and Powell, "Dose rate saturation in plastic scintillators," In: *Organic Scintillators and Liquid Scintillation Counting,* Horrocks and Peng (eds.), Academic Press. New York, p. 266, 1971.

Ho et al., "Preparation of microemulsions using polyglycerol fatty acid esters as surfactant for the delivery of protein drugs," *J. Pharm. Sci.,* 85:138–143, 1996.

Hoar and Schulman, "Transparent water–in–oil dispersions: the oleopathic hydro–micelle," *Nature,* 152:102–103, 1943.

Horrocks, In: *Applications of Liquid Scintillation Counting.* Academic Press. New York. p. 16, 1964.

Lade et al., "On the nanoparticle synthesis in microemulsions: detailed characterization of an applied reaction mixture," *Collids and Surfaces A: Physicochemical and Engineering Aspects,* 163:3–15, 2000.

Li and Park, "Particle size distribution in the synthesis of nanoparticles using microemulsions," *Langmuir,* 15:952–956, 1999.

Meier, "Nanostructure synthesis using surfactants and copolymers," *Current Opinion in Colloid & Interface Science,* 4:6–14, 1999.

Munshi et al., "Preparation and size modulation of drug loaded nanoencapsulated particles using microemulsion mediated method," *Journal of Controlled Release,* 41:S7, Abstract #P7, 1997.

Myers and Brush, "Counting of alpha and beta radiation in aqueous solutions by the detergent–anthracene scintillation method," *Analyt. Chem.,* 34:342–245, 1962.

Porta et al., "Synthesis of spherical nanoparticles of Cu2L2O5 (L=Ho, Er) from W/O microemulsions," *Colloids and Surfaces A: Physicochemical and Engineering Aspects,* 160:281–290, 1999.

Ruys and Mai, "The nanoparticle–coating process: a potential sol–gel route to homogenous nanocomposites," *Materials Science and Engineering,* A265:202–207, 1999.

Schram, "Flow–monitoring of aqueous solutions containing weak $\beta-$ emitters," In: *The Current Status of Liquid Scintillation Counting,* Bransome (ed), Grune and Stratton. New York, pp. 95–109, 1970.

Song and Kang, "Preparation of high surface area tin oxide powders by a homogeneous precipitation method," *Materials Letters,* 42:283–289, 2000.

Steinberg, "Radioassay of carbon–14 in aqueous solutions using a liquid scintillation spectrometer," *Nature,* 182:740–741, 1958.

Tang et al., "Electrochemical synthesis of polyaniline nanoparticles," *Electrochemistry Communications,* 2:32–35, 2000.

Tojo et al., "Influence of reactant excess and film flexibility on the mechanism of nanoparticle formation in microemulsions: A Monte Carlo simulation," *Langmuir,* 14:6835–6839, 1998.

Xiangling et al., "Growth of polymer nanoparticles in microemulsion polymerization initiated with ray," *Radiation Physics and Chemistry,* 54: 279–283, 1999.

NANOSCINTILLATION SYSTEMS FOR AQUEOUS-BASED LIQUID SCINTILLATION COUNTING

The patent application claims priority to U.S. Provisional Patent Application Serial No. 60/296,124 filed Jun. 7, 2001 entitled, "Nanoscintillation Systems for Aqueous-Based Liquid Scintillation Counting" by Russell J. Mumper and Michael Jay. That application is incorporated herein by reference in its entirety.

Copending U.S. application Ser. No. 09/812,884 filed Mar. 21, 2001 entitled, "Microemulsions as Precursors to Solid Nanoparticles" by Russell J. Mumper and Michael Jay is incorporated herein by reference in its entirety.

FILED OF THE INVENTION

This invention relates to nanotechnology and more particularly relates to the use of nanotechnology to overcome solubility problems in pharmaceutical drug delivery.

The present invention relates to nanoparticles containing fluor molecules to detect beta-particle emitting radioisotopes without the use of commonly employed organic-based scintillation cocktails. Although organic solvent-based scintillation cocktails are efficient, the disposal of the large quantities of "mixed" (radioactive and organic) waste generated by the use of these cocktails presents an economical and environmental challenge. Nanoscintillation systems, or nanoparticles containing fluor molecules, can be engineered from three different oil-in-water microemulsion precursors, permanently suspended in aqueous-based media, and used to detect electron or alpha-particle emitting radioisotopes in the absence of any organic-based solvents.

BACKGROUND OF THE INVENTION

As early as 1937, it was observed that certain organic materials fluoresced following excitation from external sources. Approximately 10 years later, it was demonstrated that radioactive sources could induce scintillations in aromatic solvents that contained certain solutes. These early beginnings of "liquid scintillation counting" led to rapid advances in counting instrumentation (most notably the coincidence method) and to the development of scintillation "cocktails". Many of the solvent-fluor combinations developed during the early work on scintillation cocktails are still in use today. Since most of the efficient fluors were nonpolar, organic aromatic compounds, the primary solvents used to solubilize the fluors were also non-polar and aromatic. Further desirable properties such as high energy transfer capabilities and favorable chemical characteristics (freezing, boiling and flash points) led to the use of toluene and xylenes as the most widely employed primary solvents in scintillation cocktails.

The counting of aqueous samples containing $\beta^-$-emitting radionuclides presented challenges in the development of suitable cocktails. Two approaches to overcoming the immiscibility of the aqueous samples and the organic cocktail solvents were studied. The initial approach involved dispersing organic fluor molecules in an aqueous solution that could be easily mixed with the aqueous sample to be counted. An examination of this approach reveals that several strategies for dispersing fluors were attempted and that some success was achieved.

Steinberg described a scintillation counting system in which a finely divided fluor, e.g. anthracene crystals, was dispersed in an aqueous solution (Steinberg. D. Radioassay of carbon-14 in aqueous solutions using a liquid scintillation spectrometer. Nature. 182:740–741, 1958) By achieving intimate contact between the sample and the fluor, many problems related to insolubility of the sample in organic solvents or to chemical quenching were eliminated. Myers and Brush reported the use of blue-violet grade anthracene particles coated with detergents as efficient systems for counting aqueous samples (Myers. L. S. Brush. A. H. Counting of alpha and beta radiation in aqueous solutions by the detergent-anthracene scintillation method. Analyt. Chem. 34:342–245, 1962) Work was also carried out in which a product known as "Pilot B" was employed; this product was composed of a polyvinyltoluene host containing p-terphenyl and diphenylstilbene as fluors (Harrah, L. A., Powell, R. C. Dose rate saturation in plastic scintillators. In: Organic Scintillators and Liquid Scintillation Counting. Ed. D. L. Horrocks and C. T. Peng. Academic Press. New York. p. 266, 1971) Either beads or filaments of Pilot B were packed into vials and covered with aqueous solutions containing $\beta^-$-emitting radionuclides. Reasonable counting efficiencies were obtained with these systems. Detectors containing suspended scintillators ultimately found usefulness in flow-through cells used to detect $\beta^-$-emitting radionuclides in liquid chromatography effluents (Schram, E. Flow-monitoring of aqueous solutions containing weak $\beta^-$ emitters. In: The Current Status of Liquid Scintillation Counting. Ed. E. D. Bransome. Grune and Stratton. New York. pp. 95–109. 1970) Finally, a system employing the formation of micellar suspensions for scintillation counting was reported by Ewer, M. J., Harding, N. G. L. Micellar scintillators: A rational approach to the design of stable assay solvents for liquid scintillation counting. In: Liquid Scintillation Counting. Volume 3. Ed. M. A. Crook and P. Johnson. Hevden & Son. London. pp. 220–233, 1974. The authors referred to work on micelles in aqueous systems, but ultimately settled on inverted micelles in organic solvents; in both cases, the fluors were located in the organic phase.

The disadvantages of these systems included maintaining the stability of the dispersion, and maintaining intimate contact between the radioactive sample and the fluor molecule. In addition, for some of these systems, it was evident that the addition of the aqueous radioactive sample could have untoward effects on the ability of the system to reliable quantify the amount of radioactivity in the sample. When the fluor molecule was protected from the samples, as in the case of filaments and modem flow-through cells, a distinct advantage was the marked reduction in chemical quenching, although optical quenching (self-quenching) was still a potential problem.

This approach was ultimately abandoned in favor of the alternative approach in which aqueous samples were mixed or solubilized in organic solvents into which fluors had been dissolved. Initially, this was accomplished by employing secondary solvents that were miscible with both water and toluene (e.g., alcohols, dioxane). Ultimately, a series of new surfactants were developed that allowed the emulsification of aqueous samples in organic cocktail solvents in sufficient quantities. This is still the basic technology employed when researchers use liquid scintillation counting to quantify the amount of radioactivity in aqueous samples. Commercially available cocktails may contain combinations of solvents, emulsifying agents and primary and secondary fluors. Although widely used, these cocktails have several shortcomings. Among these are that impurities in aqueous samples can lead to significant chemical and optical quenching; this can also occur as a result of the significant quantities of dissolved oxygen frequently found in aqueous samples. The emulsifying agents themselves can interact with fluor molecules resulting in significant quenching; the same can occur with solubilizing agents used to solubilize certain samples such as tissues or electrophoretic gels. Organic solvents and floors can interact with plastic scintillation vials producing wall effects. However, the greatest problem involves the disposal of the large quantities of "mixed" (radioactive and organic) waste generated by liquid scintillation counting. For example, a 1990 report commissioned by the Nuclear Regulatory Commission and the Environment Protection Agency titled "National Profile on Commercially Generated Low-Level Radioactive Mixed Waste" (NUREG/CR-5938) demonstrated the extent of the problem. Based on the report, 140,000 ft$^3$ of mixed waste was generated by industry and academia in the United States in 1990 alone. Of this, approximately 100,000 ft$^3$ or 71% was hazardous organic liquid scintillation fluid containing low-level long-lived mixed radioactive waste.

The most common fluor molecule used in organic-based cocktails is 2,5-diphenyloxazole (PPO), which is classified as "water-insoluble". Further, PPO has the highest quantum yield ($\phi$, 0.83) of the four primary fluor molecules shown in Table 1. For liquid scintillation counting, the optimal concentration of PPO dissolved in toluene or xylene is 5–7 mg/mL.

TABLE 1

Characteristics of Scintillators Used in Liquid Scintillation Counting

| Scintillator | Optimum [Flour] mg/mL | Fluorescence Maximum (nm) |
| --- | --- | --- |
| Primary | | |
| 2,5-diphenyloxazole(PPO) | 5–7 | 375 |
| 2,(4-biphenylyl)-5-phenyl-1,3,4-oxadiazole (PBD) | 8–10 | 375 |
| 2-(4-biphenylyl)-5-(4-tert-butylphenyl)-1,3,4-oxadiaole butyl-PBD) | 12 | 385 |
| 2,5-bis(5-tert-butyl-2-benzoxazolyl)thiophene (BBOT) | 7 | 446 |
| Secondary | | |
| 1,4-bis(5-phenyloxazol-2yl)benzene(POPOP) | 0.05–0.2 | — |
| 1,4-bis(2-methylstyryl)benzene(bis-MSB) | 1.5 | — |

U.S. Pat. No. 4,588,698 by Gruner et al. teaches the use of polyvinyltoluene microspheres containing solid phase scintillators that are coated with carbohydrate materials that provide a selective permeable coating for radioimmunoassay. A specific requirement is that the microspheres have a diameter of at least 1 micrometer (1000 nanometers), and more preferably have a "width at least as wide as the range of radioactivity of said radiation". As a result of the selective permeable coating and the large size of the microspheres, the radiation detection system would be able to detect more diffusable lower molecular weight compounds with little or no interference from less diffusible higher molecular weight compounds. Gruner et al. do not teach the use of nanoparticles containing fluor molecules made from oil-in-water microemulsion precursors wherein said nanoparticles have diameters less than 100 nanometers and that are permanently suspended in an aqueous medium.

U.S. Pat. No. 5,512,753 by Thomson et al. describe the use of scintillator capsules wherein a liquid scintillator core is encapsulated within a shell made from a polymer such as melamine formaldehyde or polymethyl methacrylate. Thomson et al. teach the use of scintillator capsules having diameters from 0.1–10,000 micrometers made by "mechanical/physical processes or chemical processes" such as spray-coating, pan coating, fluid-bed coating, and interfacial polymerization or other chemical techniques that occur as an "emulsion or dispersion". A preferred embodiment of the Thomson et al. invention is that greater than 99% of the scintillator core comprises aromatic liquid solvent(s) such as toluene or xylene that has dissolved primary fluor molecule in the range of 0.01 to 5.0% w/w and dissolved secondary fluor molecule in the range of 0.001 to 0.5% w/w. Thomson et al. do not teach the use of nanoparticles containing solid fluor molecules made from oil-in-water microemulsion precursors wherein said nanoparticles have diameters less than 100 nanometers and that are permanently suspended in an aqueous medium. Further, Thomson et al. do not teach the use of a system that is free of organic solvents. Finally, Thomson et al. do not the teach the use of a detection system that may comprise up to 33% w/w fluor molecule U.S. Pat. No. 4,127,499 by Chen et al. describes the use of polymeric particles derived from a latex that are coated with at least one uniformly dispersed fluor wherein said latex particles have a diameter no greater than 0.2 micrometers. Chen et al. teaches the use of "substantially dry" systems wherein at least 80% by weight of water has been removed. Chen et al. further teach a method of preparing the fluor-coated latex particles by adding fluor molecule dissolved in a water-miscible solvent to latex particles with subsequent addition of water to force the fluor molecules into or onto the latex particles. Chen et al. further teach a method of coating the prepared system onto a solid support such as paper or film. Chen et al. do not teach the use of nanoparticles containing fluor molecules made from oil-in-water microemulsion precursors wherein said nanoparticles have diameters less than 100 nanometers and that are permanently suspended in an aqueous medium. Chen et al. further do not teach the use of nanoparticles containing high concentrations of fluor molecules that are formed in a one-step process and immediately useable.

U.S. Pat. No. 5,250,236 by Gasco describes the use of solid lipid microspheres that are formed by diluting one volume of the mixture of molten lipid substance, water, surfactant and possibly a co-surfactant to 100 volumes of cold water. Gasco teaches the preparation of microspheres smaller than one micrometer and in particular between 50–800 nanometers, and preferably between 100 and 400 nanometers. Gasco also teaches the preparation of microspheres wherein said solid lipid microspheres may contain a pharmacologically active substance, such as a drug. Gasco does not teach the use of nanoparticles containing fluor molecules made from oil-in-water microemulsion precursors wherein said nanoparticles are formed from oil-in-water microemulsions directly by cooling or by polymerization with no dilution of the most useful system.

As illustrated, the references described above appear to lack preferred compositions and properties for an effective and useful system to detect beta-particle emitting radioisotopes. Namely, the references do not describe or teach the use of oil-in-water microemulsion precursors wherein the oil-phase of the microemulsion contains high concentrations of fluor molecules; wherein said oil-in-water microemulsions are subsequently treated, or cured, to produce stable, permanently suspended nanoparticles having diameters less than 1000 nanometers, or even less than 100 nanometers. These useful nanoscintillation systems can be engineered in a one-step process and used to detect beta-particle emitting radioisotopes.

SUMMARY OF THE INVENTION

In one respect, the invention involves a nanoscintillation system including nanoparticles suspended in an aqueous vehicle. The nanoparticles include: at least one nanoparticle matrix material, at least one surfactant or co-surfactant or a mixture thereof, and at least one primary or secondary fluor molecule or a mixture thereof. The nanoparticles can have a diameter less than 300 nanometers. The nanoparticles can have a diameter less than 100 nanometers. The nanoscintillation system can also include an electron-emitting or alpha-particle-emitting radioisotope. The electron-emitting or alpha-particle-emitting radioisotope can be free or attached to one or more molecules in the aqueous vehicle. The nanoscintillation system can also include one or more ligands coupled to one or more of the nanoparticles. The one or more ligands can include a protein, carbohydrate, or a combination thereof. The nanoparticle matrix material can include emulsifying wax, a polyoxyethylene sorbitan fatty acid ester, a polyoxyethylene alkyl ether, a polyoxyethylene stearate, or polystyrene or its derivative or copolymer thereof. The nanoparticle matrix material can be present at a concentration from 0.1 to 300 mg/mL. The aqueous vehicle can include water or an aqueous buffer. The surfactant or co-surfactant can include a polyoxyethylene alkyl ether, a polyoxyethylene sorbitan fatty acid ester, a polyoxyethylene stearate, an alkoxylated alcohol or its derivative thereof, or an alcohol. The surfactants can be present at a total concentration of 1–5000 mM. The primary fluor molecule can include 2,5-diphenyloxazole (PPO), 2-(4-biphenylyl)-5-phenyl-1,3,4-oxadiazole (PBD), 2-(4-biphenylyl)-5-(4-tert-butylphenyl)-I,3,4-oxadiazole (butyl-PBD), 2,5-bis(5-tert-butyl-2-benzoxazolyl)thiophene (BBOT), or derivatives or combinations thereof. The secondary fluor molecule can include 1,4-bis(5-phenyloxazol-2yl)benzene (POPOP), 1,4-bis(2-methylstyryl)benzene (bis-MSB), or derivatives or combinations thereof. The primary fluor molecules can be present at a total concentration of at least 1 mg/mL. Water can be at least 50% of the total weight of the nanoscintillation system.

In another respect, the invention involves a method for scintillation measurement. A nanoscintillation system as described above (a nanoscintillation system including nanoparticles suspended in an aqueous vehicle, the nanoparticles including: at least one nanoparticle matrix material, at least one surfactant or co-surfactant or a mixture thereof, and at least one primary or secondary fluor molecule or a mixture thereof) is obtained, and scintillation associated with the nanoscintillation system is measured.

In another respect, the invention involves a nanoparticle including: at least one nanoparticle matrix material, at least one surfactant or co-surfactant or a mixture thereof, and at least one primary or secondary fluor molecule or a mixture thereof, wherein the nanoparticle is made from an oil-in-water microemulsion precursor. The nanoparticle can be made by cooling the oil-in-water microemulsion to room temperature while stirring. The nanoparticle can include an emulsifying wax, a polyoxyethylene sorbitan fatty acid ester, a polyoxyethylene alkyl ether, a polyoxyethylene stearate, polystyrene, or derivatives or combinations thereof. The nanoparticle can include polystyrene, a copolymer of polystyrene, or a derivative thereof and having a melting point between 40° C. and 80° C. The nanoparticle can include styrene, divinyl benzene, toluene, an aromatic or unsaturated monomer capable of being polymerized by one or more free radicals, or a derivative or combination thereof. The nanoparticle can be present at a concentration from 0.1 to 300 mg/mL. The surfactant or co-surfactant can include a polyoxyethylene alkyl ether, a polyoxyethylene sorbitan fatty acid ester, a polyoxyethylene stearate, an alkoxylated alcohol or its derivative thereof, or an alcohol. The surfactants can be present at a total concentration of 1–5000 mM. The surfactants can be present at a total concentration of 1–300 mM. The primary fluor molecule can include 2,5-diphenyloxazole (PPO), 2-(4-biphenylyl)-5-phenyl-1,3,4-oxadiazole (PBD), 2-(4-biphenylyl)-5-(4-tert-butylphenyl)-1,3,4-oxadiazole (butyl-PBD), 2,5-bis(5-tert-butyl-2-benzoxazolyl)thiophene (BBOT), or derivatives or combinations thereof. The secondary fluor molecule can include 1,4-bis(5-phenyloxazol-2yl)benzene (POPOP), 1,4-bis(2-methylstyryl)benzene (bis-MSB), or derivates or combinations thereof. The primary fluor molecules can be present at a total concentration of at least 1 mg/mL. The nanoparticle can be made by polymerizing the nanoparticle matrix material within the oil-in-water microemulsion precursor by free-radical polymerization. Free-radical polymerization can be performed by heating the oil-in-water microemulsion precursor, by adding a free-radical initiator, or by a combination thereof.

In another respect, the invention involves a method for scintillation measurement, in which a nanoparticle as described above (a nanoparticle including: at least one nanoparticle matrix material, at least one surfactant or co-surfactant or a mixture thereof, and at least one primary or secondary fluor molecule or a mixture thereof, wherein the nanoparticle is made from an oil-in-water microemulsion precursor) is obtained, and scintillation associated with the nanoparticle is measured.

In another respect, the invention involves a method of making a nanoscintillation system. A liquid nanoparticle matrix material is dispersed with a fluor molecule in an aqueous continuous phase to form a surfactant stabilized microemulsion. The surfactant stabilized microemulsion is cooled to room temperature while stirring.

In another respect, the invention involves a method of making a nanoparticle useful for scintillation. A nanoparticle matrix material is obtained. The nanoparticle matrix material is melted to form a liquid dispersed phase. A fluor molecule is dispersed into the liquid dispersed phase. The the liquid dispersed phase is dispersed, including the fluor molecule, in an aqueous continuous phase to form a surfactant stabilized microemulsion. The microemulsion is cooled while stirring to form a solid stable nanoparticle having a diameter of less than about 300 nanometers, which includes the fluor molecule either entrapped in or adsorbed to the nanoparticle. The melting can occur at a temperature between about 35° C. and about 100° C. The cooling can include cooling with no dilution in water.

In another respect, the invention involves a method of making a nanoscintillation system. A liquid nanoparticle matrix material is dispersed with a fluor molecule in an aqueous continuous phase to form a surfactant stabilized microemulsion, and the liquid nanoparticle matrix material is polymerized by free-radical polymerization. The free-radical polymerization can be performed by heating the surfactant stabilized microemulsion, by adding a free-radical initiator, or by a combination thereof. The method can also include concentrating the nanoscintillation system. The concentrating step can include comprising centrifugal ultrafiltration.

DETAILED DESCRIPTION OF THE INVENTION

Figure 1:
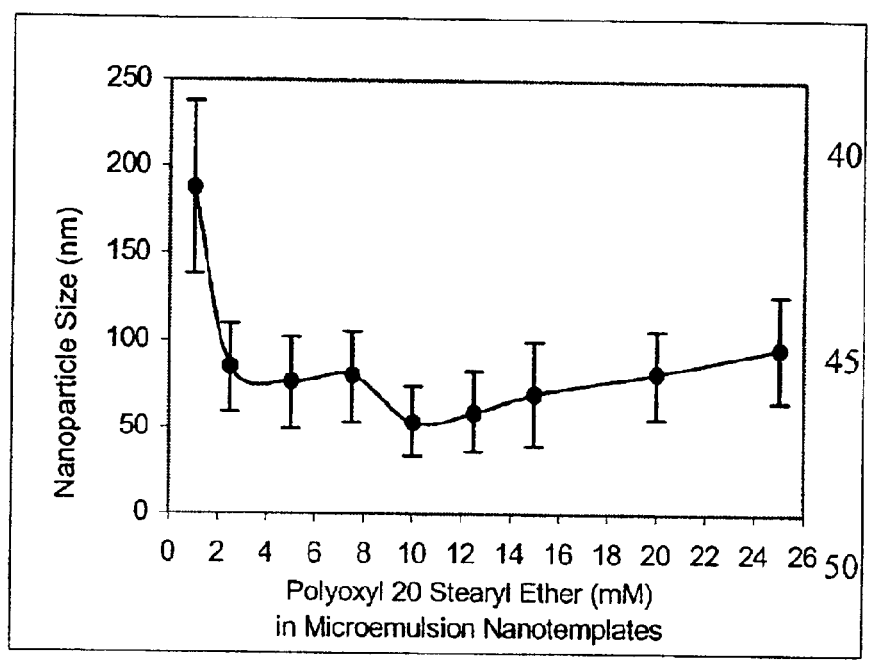
FIG. 1 Particle size of cured nanoparticles made from oil-in-water microemulsion precursors as a function of the final concentration of polymeric surfactant used in the process.

This invention relates to the engineering of nanoparticles, containing fluor molecules, that are permanently suspended in aqueous-based media and used to detect either electron-emitting isotopes or alpha-particle emitting radioisotopes. Electron emitting isotopes (e.g., $^3$H and $^{14}$C) or alpha-particle emitting isotopes in samples generated during experiments are typically aqueous in nature and must be mixed with an organic solvent containing fluor molecules (scintillators) to form an emulsion-based cocktail. The most efficient fluor molecules have very low water solubilities, necessitating the use of organic solvents such as toluene or xylene. Although very efficient at quantifying radioactivity in the samples, there are several problems associated with this technology. The amount of an aqueous sample that can be added to a cocktail solution is finite and may be a limiting factor with regard to sensitivity. In addition, after they are used, radioactive organic cocktails present a significant waste disposal problem in terms of cost and environmental hazards. The development of an aqueous-based scintillation cocktail would provide tremendous scientific, economical and environmental advantages over the traditionally used organic-based cocktails.

The very small particle size of the nanoscintillation systems, or nanoparticles less than 100 nanometers containing fluor molecules, would theoretically aid in the detection efficiency of the most commonly used $\beta^-$ particles, $^3$H and $^{14}$C. For example, $\beta^-$ particles are observed to have uniform, low specific ionization ($\delta E/\delta x$) except at the end of its path. The range of a 10 keV $\beta^-$ particle in water is estimated to be 2.5 $\mu$m (Horrocks, D. L. In: Applications of Liquid Scintillation Counting. Academic Press. New York. p. 16, 1964). If nanoparticles with an average diameter of 50 nm are dispersed in an aqueous solution at a concentration of 2 mg/mL, then it can be calculated that the average distance between particles in that solution is 0.32 $\mu$m. Thus, it is expected that $\beta^-$ particles emitted from $^3$H and $^{14}$C that are uniformly distributed in this nanoparticle suspension will have a high probability of interacting with a fluor molecule.

This invention also relates to the use of oil-in-water microemulsions as precursors to engineer solid nanoparticles containing fluor molecules. It was discovered that very poorly water soluble drugs could be easily solubilized in the oil-phase of the microemulsion precursor and subsequently entrapped in nanoparticles engineered from said microemulsion precursors. For example, it was discovered that the solubility of Gadolinium acetylacetonate (GdAcAc), a potential anti-cancer agent, in water could effectively be increased by at least 4000-fold using the methods described in this invention. Specifically, the solubility of GdAcAc is only 1 mg per 2000 mL water However, utilizing the said methods described in this invention to entrap GdAcAc in stable nanoparticles having diameters of about 50 nanometers, only 1 milliliter of water is required to solubilize 2 mg GdAcAc. It was hypothesized that said methods could be applied to solubilize fluor (scintillator) molecules known to have very limited or no aqueous solubility, and thus, eliminate the need for organic solvent-based liquid scintillation cocktails.

An additional advantage of this invention over existing technology is that the described nanoscintillation systems can be engineered rapidly, reproducibly, and cost-effectively in a one-step process contained in one manufacturing vessel, vial, or container.

As used herein, certain terms may have the following defined meanings.

As used in the specifications and claims, the singular form a, an, and the include plural references unless the context clearly dictates otherwise. For example, the term a nanoparticle may refer to one more nanoparticles for use in the presently disclosed systems.

As used herein, the term "solubility" refers to the extent to which a solute is dissolved in a solvent. Solubility can be described in terms such as described in REMINGTON'S PHARMACEUTICAL SCIENCES ranging from very soluble (less than 1 part of solvent per 1 part of solute) to insoluble (more than 10,000 parts of solvent for 1 part of solute). The term "water-insoluble" refers to a substance or solute where more than 10,000 parts of water are needed to dissolve 1 part of solute.

The term "nanoparticle" refers to particles have diameters below 1 micrometer in diameter that are comprised of primarily one solid phase. "Stable nanoparticles" remain largely unaffected by environmental factors such as temperature, pH, body fluids, or body tissues. However, solid nanoparticles may be designed to respond to these environmental factors in a controlled and predictable manner. The solid nanoparticles may contain many different materials for various pharmaceutical and engineering applications such as plasmid DNA for gene therapy and genetic vaccines, peptides and proteins or small drug molecules, magnetic substances for use as nanomagnets, lubricants, or chemical, thermal, or biological sensors. It is also envisioned that fluor molecules may be entrapped or coated on any submicron particle, including but not limited to the following, liposome, micelle, polymeric nanoparticle, precipitated particle, or particles formed by radiation, free-radical polymerization, milling, homogenization, or microfluidization.

As used herein, the term "nanoparticle matrix material" refers to those materials that can form both the shell and majority of the weight composition of the said nanoparticle. Two types of matrix materials are envisioned, both serving as the oil-phase in the oil-in-water microemulsion precursor. The first matrix materials are those materials that are amphipathic in nature (having both hydrophilic and hydrophobic moieties), are primarily water-insoluble, and that melt above room temperature in the range of 30–100° C., more preferably in the range of 40–90° C., and most preferably in the range of 40° C.–80° C. It is envisioned that these materials can be any substance meeting the above criteria and that are a wax, lipid, polymeric surfactant, or combinations thereof. It is most preferred, but not absolutely required, that these materials are selected from the following; emulsifying wax, polyoxyethylene sorbitan fatty acid esters, polyoxyethylene alkyl ethers, polyoxyethylene stearates, or low molecular weight polystyrene, polyvinyltoluene, or its derivatives or copolymers of aromatic polymers thereof. The second matrix materials are those materials that are liquids at room temperature (i.e., <30° C.), and that can become a solid by free-radical polymerization from within the oil-phase of the oil-in-water microemulsion; wherein said polymerization process may be induced by any method including, but not limited to, heat, change in temperature, light, ultraviolet radiation, free-radical initiators, or combinations thereof. It is most preferred, but not absolutely required, that these materials are selected from the following; styrene, divinyl benzene, toluene, or their derivatives or combinations thereof.

As used herein, the term "permanently suspended" refers to nanoparticles, engineered from said oil-in-water microemulsion precursors, that remain suspended in aqueous media such as water or buffer for at least one month at room temperature and that cannot be settled by ultracentrifugation treatment at 50,000 cpm for 5 minutes.

As used herein, the term "ligand" refers to those substances that be recognized and bind to a specific molecule, a cell-receptor, an antibody, an anti-antibody, or combinations thereof. It is preferred that the ligand be comprised of carbohydrates or amino acids or combinations thereof. It is most preferred that the ligand be a monoclonal or polyclonal antibody. The ligand may be attached onto said nanoparticles by any number of processes including, but not limited to, covalent attachment, ionic interaction, hydrophobic interaction, and hydrogen bonding. It is also envisioned that the ligand may be chemically modified to enhance the attachment of said ligand to said nanoparticle to either increase the efficiency of detection or selectively detecting one or more radioactive molecules from other molecules.

As used herein, a "microemulsion" is a stable biphasic mixture of two immiscible liquids stabilized by a surfactant and usually a co-surfactant. Microemulsions are thermodynamically stable, isotropically clear, form spontaneously without excessive mixing, and have dispersed droplets in the range of 5 nm to 140 nm. In contrast, emulsions are opaque mixtures of two immiscible liquids. Emulsions are thermodynamically unstable systems are usually require the application of high-torque mechanical mixing or homogenization to produce dispersed droplets in the range of 0.2 to 25 $\mu$m. Both microemulsions and emulsions can be made as water-in-oil or oil-in-water systems. Whether water-in-oil or oil-in-water systems will form is largely influenced by the properties of the surfactant. The use of surfactants that have hydrophilic-lipophilic balances (HLB) of 3–6 tend to promote the formation of water-in-oil microemulsions while those with HLB values of 8–18 tend to promote the formation of oil-in-water microemulsions.

Microemulsions were first described by Hoar and Schulman in 1943 after they observed that a medium chain alcohol could be added to an emulsion to produce a clear system within a defined 'window', now referred to as a microemulsion window. A unique physical aspect of microemulsions is the very low interfacial surface tension ($\gamma$) between the dispersed and continuous phases. In a microemulsion, the small size of the dispersed droplets present a very large interface. A thermodynamically stable microemulsion can only be made if the interfacial surface tension is low enough so that the positive interfacial energy ($\gamma A$, where A equals the interfacial area) can be balanced by the negative free energy of mixing ($\Delta G_m$). The limiting $\gamma$ value needed to produce a stable microemulsion with a dispersed droplet of 10 nm, for example, can be calculated as follows: $\Delta G_m = -T\Delta S_m$ (where T is the temperature and the entropy of mixing $\Delta S_m$ is of the order of the Boltzman constant $\kappa_B$). Thus, $\kappa_B T = 4\pi r^2 \gamma$ and the limiting $\gamma$ value is calculated to be $\kappa_B T/4\pi r^2$ or 0.03 mM m$^{-1}$. Often, a co-surfactant is required in addition to the surfactant to achieve this limiting interfacial surface tension.

In addition to their unique properties as mentioned above, microemulsions have several key advantages for use as delivery systems intended for use in marketed pharmaceutical products, namely; i) increased solubility and stability of drugs incorporated into the dispersed phase, ii) increased absorption of drugs across biological membranes, iii) ease and economy of scale-up (since expensive mixing equipment is often not needed), and iv) rapid assessment of the physical stability of the microemulsion (due to the inherent clarity of the system). For example, oil-in-water microemulsions have been used to increase the solubility of lipophilic drugs into formulations that are primarily aqueous-based (Constantinides, P. P. Lipid microemulsions for improving drug dissolution and oral absorption: physical and biopharmaceutical aspects. Pharm. Res. 12:1561–1572, 1995). Both oil-in-water and water-in-oil microemulsions have been also been shown to enhance the oral bioavailability of drugs including peptides (Bhargava, H. N., Narurkar, A. Lieb, L. M. Using microemulsions for drug delivery. Pharm. Tech. March 46–53, 1987; Ho H. O., Hsiao, C. C., Sheu, M. T. Preparation of microemulsions using polyglycerol fatty acid esters as surfactant for the delivery of protein drugs. J. Pharm. Sci. 85:138–143, 1996; Constantinides, P. P. Lipid microemulsions for improving drug dissolution and oral absorption: physical and biopharmaceutical aspects. Pharm. Res. 12:1561–1572, 1995).

Although microemulsions have many potential advantages they do have potential limitations, namely; a) they are complex systems and often require more development time, b) a large number of the proposed surfactants/co-surfactants are not pharmaceutically acceptable (Constantinides, P. P. Lipid microemulsions for improving drug dissolution and oral absorption: physical and biopharmaceutical aspects. Pharm. Res. 12:1561–1572, 1995), c) the microemulsions are not stable in biological fluids due to phase inversion. Thus, the microemulsions themselves are not effective in delivering drugs intracellularly or targeting drugs to different cells in the body. The development of a microemulsion involves the very careful selection and titration of the dispersed phase, the continuous phase, the surfactant and the co-surfactant. Time consuming pseudo-phase ternary diagrams involving the preparation of a large number of samples must be generated to find the existence of the 'microemulsion window', if any. In general, a water-in-oil microemulsion is typically much easier to prepare than an oil-in-water microemulsion. The former system is useful for formulating water-soluble peptides and proteins to increase their stability and absorption while the later system is preferred for formulating drugs with little or no aqueous solubility.

Used herein a "surfactant" refers to a surface-active agent, including substances commonly referred to as wetting agents, detergents, dispersing agents, or emulsifying agents. For the purposes of this invention, it is preferred that the surfactant has an HLB value of 6–20, and most preferred that the surfactant has an HLB value of 8–18. It is preferred, but not required, that the surfactant is selected from the following groups; polyoxyethylene alkyl ethers, polyoxyethylene sorbitan fatty acid esters, polyoxyethylene stearates, alkoxylated alcohols sold under the trademark TRITON or its derivatives thereof, or an alcohol. It is also most preferred that the surfactant has an HLB value of 8–18 and has an aromatic moiety such as found in octylphenol ethoxylates sold under the trademark TRITON X-100 or alkoxylates sold under the trademark TRITON N-57 (n-Alkyl phenyl polyethylene oxide; HLB=10). A "cosurfactant" refers to a surface-active agent, including substances commonly referred to as wetting agents, detergents, dispersing agents, or emulsifying agents. It is preferred, but not required, that the co-surfactant is selected from the following groups; polyoxyethylene alkyl ethers, polyoxyethylene sorbitan fatty acid esters, polyoxyethylene stearates, or alkoxylated alcohols sold under the trademark TRITON or its derivatives thereof. It is most preferred that the co-surfactants are short-chained alcohols such as 1-butanol, 2-pentanol, and 1-phenoxyethanol, or combinations thereof. It is also preferred that the total concentration of surfactant and/or co-surfactant present in both the oil-in-water microemulsion precursor and the nanoscintillation system is in the range of 1–5000 mM, more preferably in the range of 1–1000 mM, and most preferably in the range of 1–300 mM. It is envisioned that any surfactant, co-surfactant, or combination thereof, that promotes the formation of a oil-in-water microemulsion may be useful for this invention.

The growing interest in nanotechnology has also resulted in the use of microemulsions as precursors or templates to form nanoparticles within the small dispersed droplets (Li, Y., Park, C. W. Particle size distribution in the synthesis of nanoparticles using microemulsions, Langmuir, 15: 952–956, 1999; Cavalli, R., Peira, E., Caputo, O., Gasco, M. R. Solid lipid nanoparticles as carriers of hydrocortisone and progesterone complexes with cyclodextrins, International Journal of Pharmaceutics, 182:59–69, 1999; Bocca, C., Caputo, O., Cavalli, R., Gabriel, L., Miglietta, A., Gasco, M. R. Phagocytic uptake of fluorescent stealth and non-stealth solid lipid nanoparticles, International Journal of Pharmaceutics, 175: 185–193, 1998; Tojo, C., Blanco, M. C., Lopez-Ouintela, M. A. Influence of reactant excess and film flexibility on the mechanism of nanoparticle formation in microemulsions: A Monte Carlo simulation, Langmuir, 14:6835–6839, 1998; Munshi, N., De, T. K., Maitra, A. Preparation and size modulation of drug loaded nanoencapsulated particles using microemulsion mediated method, Journal of Controlled Release, 41:S7, 1997; Ruys, A. J., Mai, Y. W. The nanoparticle-coating process: a potential sol-gel route to homogeneous nanocomposites, Materials Science and Engineering 265:202–207, 1999). These reports have primarily dealt with the preparation of water-in-oil microemulsions (Lade, M., Mays, H., Schmidt, J., Willumeit, R., Schomacker, R. On the nanoparticle synthesis in microemulsions: detailed characterization of an applied reaction mixture, Colloids and Surfaces A: Physicochemical and Engineering Aspects, 163:3–15, 2000; Song, K. C., Kang, Y. Preparation of high surface area tin oxide powders by a homogeneous precipitation method, Materials Letters, 42:283–289, 2000; Porta, F., Bifulco, C., Fermo, P., Bianchi, C. L., Fadoni, M., Prati, L. Synthesis of spherical nanoparticles of Cu2L2O5 (L=Ho, Er) from W/O microemulsions, Colloids and Surfaces A: Physicochemical and Engineering Aspects, 160:281–290, 1999) whereby nanoparticles are formed in the water phase by the use of photochemistry (Agostiano, A., Catalano, M., Curri, M. L., Della Monica, M., Manna, L., Vasanelli, L. Synthesis and structural characterization of CdS nanoparticles prepared in a four-components "water-in-oil" microemulsion, Micron, 31:253–258, 2000), γ-rays (Xiangling, X., Xuewu, G., Qiang, Y., Zhicheng, Z., Ju, Z., Aizhen, N., Manwei, Z. Growth of polymer nanoparticles in microemulsion polymerization initiated with ray, Radiation Physics and Chemistry, 54: 279–283, 1999), or electrochemistry (Tang, Z., Liu, S., Wang, Z., Dong, S., Wang, E. Electrochemical synthesis of polyaniline nanoparticles, Electrochemistry Communications, 2:32–35, 2000) to induce crosslinking, polymerization (Fang, J., Stokes, K. L., Wiemann, J., Zhou, W. Nanocrystalline bismuth synthesized via an in situ polymerization microemulsion process, Materials Letters, 42:113–120, 2000; Capek, I. Microemulsion polymerization of styrene in the presence of anionic emulsifier, Advances in Colloid and Interface Science, 82: 253–273, 1999: Meier, W. Nanostructure synthesis using surfactants and copolymers, Current Opinion in Colloid & Interface Science, 4:6–14, 1999) and/or complexation of the appropriate agents in the water phase.

As used herein, the term "microemulsion precursor" refers to an oil-in-water microemulsion wherein the oil-phase droplets serves a precursor, or template, to form solid nanoparticles after subjecting said microemulsion to a curing process. The "curing" process or method involves either the direct cooling of the said microemulsion to room temperature without dilution, or by free-radical polymerization induced by heat or the inclusion of a free-radical initiator, or combinations thereof.

As used herein, the term "nanoscintillation" system refers to solid nanoparticles suspended in an aqueous vehicle wherein said nanoparticles are comprised of a nanoparticle matrix material, at least one surfactant or co-surfactant or a mixture thereof, and at least one primary or secondary fluor molecule or a mixture thereof. It is preferred that the nanoparticles have a diameter of less than 1000 nanometers and are present in the system at a concentration from 0.1–500 mg/mL, even more preferably that the nanoparticles have a diameter of less than 300 nanometers and are present in the system at a concentration from 0.1–300 mg/mL. It is most preferred that the nanoparticles have a diameter of less than 100 nanometers and are present in the system at a concentration from 0.1–10 mg/mL. It is also envisioned that fluor molecules may be entrapped or coated on any submicron particle, including but not limited to the following, liposome, micelle, polymeric nanoparticle, precipitated particle, or particles formed by radiation, free-radical polymerization, milling, homogenization, or microfluidization. Nanoscintillation systems may be used to detect an electron-emitting or alpha-particle emitting radioisotope or radioisotopes, free or attached to a molecule or molecules in an aqueous vehicle. Further, it is envisioned that said nanoscintillation systems may be used as detection systems in chromatographic analytical methods such as any type of liquid chromatography (LC) or in scintillation proximity assays (SPAs) or in radioimmuno assays (RIAs). It is further envisioned that any type of electron may be detected such as, but not limited to, beta-particles, Auger electrons, and internal conversion electrons.

As used herein, "fluor" molecules, or scintillators, refer to organic molecules that may be excited by energy to become fluorescent and emit photons. Fluor molecules that directly absorb the excitation of energy of the solvent are known as "primary fluor" molecules. "Secondary fluor" molecules are often added to amplify the primary emissions. The use of a secondary fluor molecule often results in greatly improved detection efficiency. For this invention, it is preferred, but not required that the primary fluor molecules are selected from the following; 2,5-diphenyloxazole (PPO), 2-(4-biphenylyl)-5-phenyl-1,3,4-oxadiazole (PBD), 2-(4-biphenylyl)-5-(4-tert-butylphenyl)-1,3,4-oxadiazole (butyl-PBD), or 2,5-bis(5-tert-butyl-2-benzoxazolyl)thiophene (BBOT), or combinations thereof. For this invention, it is preferred, but not required that the secondary fluor molecules are selected from the following; 1,4-bis(5-phenyloxazol-2yl)benzene (POPOP) or derivatives thereof, or 1,4-bis(2-methylstyryl)benzene (bis-MSB), or combinations thereof.

Nanoscintillation systems can be evaluated by many methods including the following three measurements: (1) the Figure of Merit, (2) the Phase Contact factor and (3) the Quench Resistance factor. The Figure of Merit (FOM) will be determined using the following equation:

$$FOM = EV/\sqrt{B}$$

where E=Counting Efficiency=cpm/dpm

V=Sample Volume

B=Background

Counting Efficiency can be determined by adding a known amount of radioactivity (dpm) (such as $^{14}$C-acetic acid or $^{3}$H-acetic acid in phosphate buffer, pH 7) to nanoscintillation systems and measuring the number of counts (cpm) detected. No automatic quench correction parameter has to be employed.

The Phase Contact (PC) factor can be determined using the following equation:

$$PC = E/E_c$$

where $E_c$=the efficiency of counting in a homogenous system.

Radiolabeled benzoic acid can be used since benzoic acid has measurable solubility in both water and toluene. A known amount of $^{14}$C-benzoic acid can be added to a nanoscintillation suspension, and the detection efficiency (E) can be measured. The same amount of $^{14}$C-benzoic acid can be added to a high-purity toluene solution into which has been dissolved an identical amount of nanoparticles that exist in the nanoscintillation suspension. The detection efficiency of this system, which can contain the same amount of fluor exists in the nanoscintillation suspension, is the $E_c$ which can then be used to calculate the PC factor. The E value obtained with the nanoscintillation suspension can be compared to the efficiency of detection obtained from a sample containing the same amount of $^{14}$C-benzoic acid added to the commercially-available Scintiverse BD cocktail.

Quench Resistance (QR) can be determined by the serial addition of a quenching agent (e.g., NaCl) to nanoscintillation Systems containing a fixed amount of $^{14}$C- or $^{3}$H-labeled acetic acid. Counting Efficiency (E) will be plotted as a function of quenching agent added; the QR factor is defined as the slope of that line. The lower the absolute value of the slope, the greater the quench resistance. This value can be compared to the QR factor measured for standard cocktails, such as ScintiVerse cocktail. The Scintiverse cocktail contains the following ingredients: 2,5-diphenyl-oxazole (PPO; 0.37% w/w), dioctyl sodium sulfosuccinate (13% w/w), disteazyl pentaerythritol diphosphite (0.03% w/w), ethylene oxide-nonylphenol polymer (3.4% w/w), 1,4-bis2-(2-methylphenyl)ethenyl-benzene (0.08% w/w), and C10–13-alkyl derivatives of benzene (82.8% w/w).

EXAMPLES

The following examples are included to demonstrate specific, non-limiting embodiments of this disclosure. It should be appreciated by those of skill in the art that the techniques disclosed in the examples that follow represent techniques discovered by the inventors to function well in the practice of the invention, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the invention.

Example 1

To determine the existence of an oil-in-water microemulsion window for the microemulsion precursor, exactly two (2) milligrams of emulsifying wax were weighed accurately into ten separate 7-mL glass vials and melted at 50° C. on a temperature calibrated magnetic hot plate. Water (0.2 µm filtered) was then added (750–1000 µL) to form a homogeneous milky slurry in the stirring water at 50° C. To form the microemulsion precursor, the surfactant polyoxy 20 stearyl ether (100 mM) in water was added (0–250 µL) so that the final surfactant concentration ranged from 0 mM to 25 mM in the ten vials. The microemulsion precursor was then removed from heat (52–54° C.) and allowed to cool to 25° C. while stirring. When cooled, visual inspection showed that systems with final surfactant concentration less than 2.5 mM were precipitated, systems with final surfactant concentration between 2.5 mM and 10 mM were either very slightly turbid or clear, and systems with a final surfactant concentration greater than 10 mM were either very turbid or precipitated. Thus, an apparent microemulsion window was defined. One hundred (100) µL of each cooled system was taken and diluted with 900 µL water. The particle size of the diluted solid nanoparticles was determined using a Coulter N4 Plus Sub-Micron Particle Sizer at 20° C. by scattering light at 90° for 120 seconds. The particle sizes of the cured solid nanoparticles as a function of surfactant concentration are shown in FIG. 1. The particle sizes of systems with no surfactant added could not be determined since the systems contained precipitates that were greater than 3000 nm in diameter. In general, the particle size results agreed with the visual observations and suggested the following; 1) solid nanoparticles less than 100 nm could be engineered from the liquid matrix oil-in-water microemulsion precursor, and 2) the resulting clarity and particle size were related to the final concentration of the surfactant used. The droplet size of the oil phase in the microemulsion nanotemplates made with a final surfactant concentration of 10 mM was measured at 55° C. and was found to be 11±3 nm demonstrating that oil-in-water microemulsion precursor could be made. To determine if the measured droplet sizes in either the microemulsion nanotemplate or the cured solid nanoparticles were due to the presence of surfactant micelles, samples were made as described above with no emulsifying wax and with final surfactant concentrations ranging from 0 mM to 100 mM in water. Interestingly, no published critical micellar concentration (CMC) value could be found for polyoxyethylene 20 stearyl ether. It is likely that the relatively heterogeneous nature of the polymeric surfactant makes the determination of its CMC difficult using conventional techniques. Photon correlation spectroscopy, using a Coulter N4 Plus Submicron Particle Sizer, was used to determine the existence and the size of the surfactant micelles. The results indicated that the surfactant does begin to form micelles (5–20 nm) between a concentration of 0.5 mM to 1 mM in water. However, these micelles are clearly absent in the cured solid nanoparticles indicating that the 50–100 nm nanoparticles could be engineered directly from the microemulsion precursors.

Example 2

Figure 2:
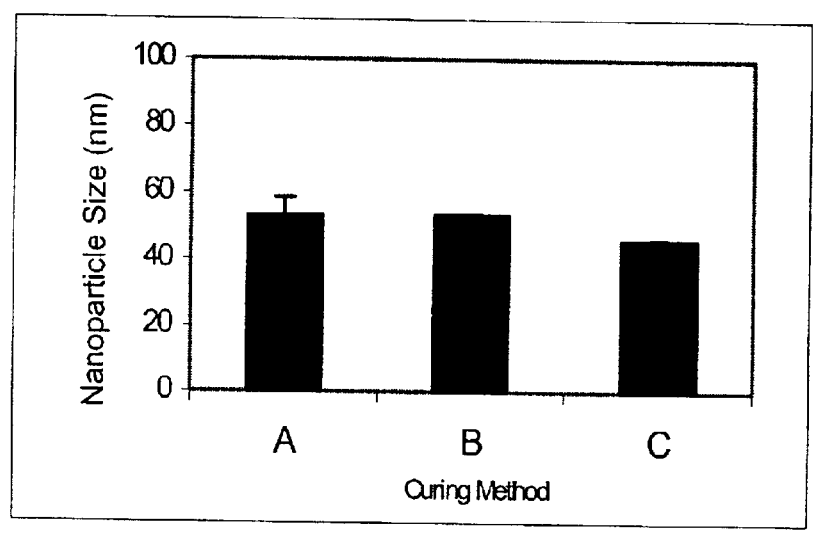
FIG. 2 The effect of three different curing methods of oil-in-water microemulsion precursors on the resulting particle size of polyoxyethylene 2 stearyl ether nanoparticles. Polyoxyethylene 2 stearyl ether is sold under the trademark Brij 72. Method A) cooling of the undiluted oil-in-water microemulsion at 55° C. to room temperature while stirring, Method B) cooling of the oil-in-water microemulsion at 55° C. by placing undiluted in a refrigerator at 4° C., and Method C) diluting (1/10) the oil-in-water microemulsion at 55° C. with water at 4° C.

Preparation of polyoxyethylene 2 stearyl ether nanoparticles. Three separate samples of polyoxyethylene 2 stearyl ether nanoparticles were engineered using the following process. Polyoxyethylene 2 stearyl ether (2 mg) was melted at 50–55° C. and dispersed in 970 microliters of water at the same temperature. Thirty microliters of solution of Tween 80 (10% v/v in water) was added to produce a clear oil-in-water microemulsion at approximately 55° C. The oil droplet size of liquid polyoxyethylene 2 stearyl ether was measured by photon correlation spectroscopy to be 22.2±1.8 nanometers at approximately 55° C. Polyoxyethylene 2 stearyl ether nanoparticles were cured by three different methods as follows: Method A) cooling of the undiluted oil-in-water microemulsion at 55° C. to room temperature while stirring, Method B) cooling of the oil-in-water microemulsion at 55° C. by placing undiluted in a refrigerator at 4° C., and Method C) diluting (1/10) the oil-in-water microemulsion at 55° C. with water at 4° C. The results as shown in FIG. 2 demonstrate that the method of curing had no effect on the size of nanoparticles formed. Further, Method A illustrated a key advantage of simply allowing the oil-in-water microemulsion to cool to room temperature to form useful solid nanoparticles. This method allows for rapid, reproducible, and cost-effective method to engineer useful nanoparticles.

Example 3

Figure 3:
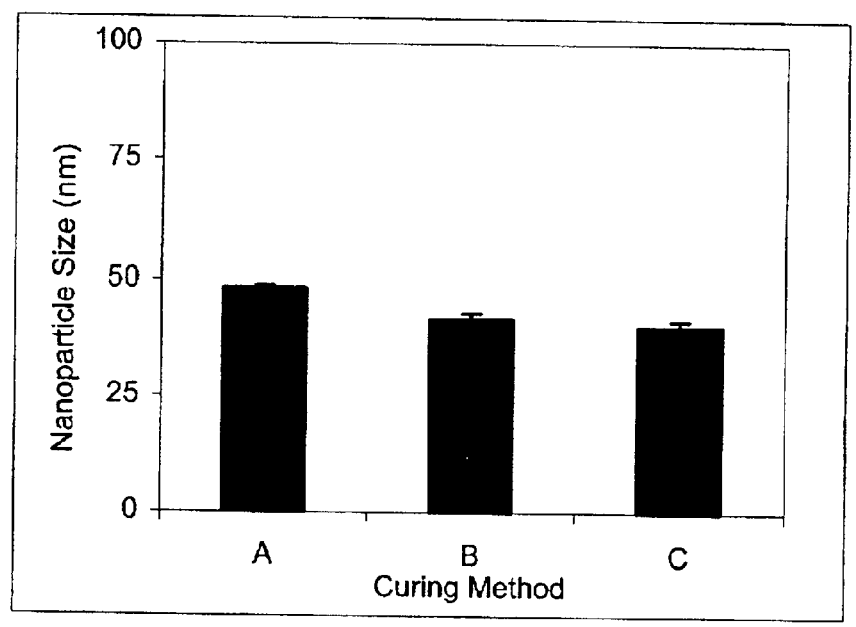
FIG. 3 The effect of three different curing methods of oil-in-water microemulsion precursors on the resulting particle size of Emulsifying Wax nanoparticles. Method A) cooling of the undiluted oil-in-water microemulsion at 55° C. to room temperature while stirring, Method B) cooling of the oil-in-water microemulsion at 55° C. by placing undiluted in a refrigerator at 4° C., and Method C) diluting (1/10) the oil-in-water microemulsion at 55° C. with water at 4° C.

Preparation of Emulsifying Wax nanoparticles. Three separate samples of emulsifying wax nanoparticles were engineered using the following process. Emulsifying wax (2 mg) was melted at 50–55° C. and dispersed in 970 microliters of water at the same temperature. Thirty microliters 100 mM polyoxyethylene 20 stearyl ether, which is sold under the trademark Brij 78 were added to produce a clear oil-in-water microemulsion at approximately 55° C. The oil droplet size of liquid emulsifying wax was measured by photon correlation spectroscopy to be 24.5±0.4 nanometers at approximately 55° C. Emulsifying nanoparticles were cured by three different methods as follows: Method A) cooling of the undiluted oil-in-water microemulsion at 55° C. to room temperature while stirring, Method B) cooling of the oil-in-water microemulsion at 55° C. by placing undiluted in a refrigerator at 4° C., and Method C) diluting (1/10) the oil-in-water microemulsion at 55° C. with water at 4° C. The results as shown in FIG. 3 demonstrate that the method of curing had no effect on the size of nanoparticles formed. Further, Method A illustrated a key advantage of simply allowing the oil-in-water microemulsion to cool to room temperature to form useful solid nanoparticles. This method allows for rapid, reproducible, and cost-effective method to engineer useful nanoparticles.

Further, the solid nanoparticles made from Method A were subjected to ultracentrifugation at 50,000 rpm for 30 minutes. Photon correlation spectroscopy analysis showed that these ultracentrifugation conditions had no effect on the intensity of light scattering or particle size indicating a very stable colloidal suspension.

Example 4

Preparation of nanoscintillation systems containing fluor molecules with a final concentration of 1 mg/mL. PPO (1 mg) was entrapped in and effectively solubilized in 2 mg nanoparticles made from emulsifying wax and a final polyoxyethylene 20 stearyl ether concentration of 10 mM. Thus, the weight composition of PPO was 33% w/w (or 1 mg PPO per 3 mg total weight). As measured by photon correlation spectroscopy (PCS), the entrapment of PPO in nanoparticles had no effect on particle size. Empty nanoparticles had a particle size of 65±23 nm and nanoparticles with PPO had a particle size of 65±24 nm. It was also confirmed that the nanoparticles containing PPO were formed directly from an oil-in-water microemulsion precursor since the droplet size of the matrix oil phase in the microemulsion at 52° C. was measured by PCS to be 20±9 nm. The use of 1% phenoxyethanol in water was also investigated as a possible energy transfer agent to enhance detection efficiency. The incorporation of phenoxyethanol into the microemulsion precursors, and subsequently the cured nanoparticles, had no effect on resulting nanoparticle size or stability. The entrapment efficiency of PPO in cured nanoparticles can be determined by gel permeation chromatography by eluting 0.1–1.0 mL samples down hand-packed Sephadex G-75 columns (9 cm×0.5 cm). In addition, the retention of PPO in cured nanoparticles can be monitored by placing GPC-eluted nanoparticles in sterile membrane dispodialyzers from Spectrum Laboratories (Rancho Dominguez, Calif.) with 10 kDa molecular weight cutoffs.

Example 5

Figure 4:
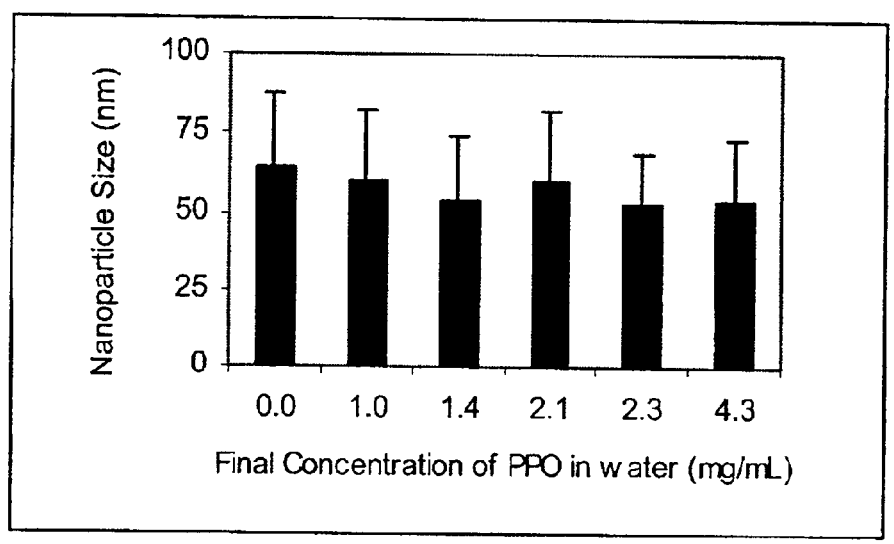
FIG. 4 Particle size of cured nanoscintillation systems made from oil-in-water microemulsion precursors as a function of the final concentration of PPO (2,5-diphenyloxazole) in water. For all preparations, the ratio of nanoparticle matrix material to PPO was 2:1 w/w.

Preparation of nanoscintillation systems containing fluor molecules with a final concentration of up to 4.3 mg/mL In order to increase the concentration of PPO in the nanoparticles, the procedure described in Example 4 was followed to engineer nanoscintillation systems having PPO with a final concentration of up to 4.3 mg/mL. For all samples, the ratio of emulsifying wax to PPO was fixed at 2:1 w/w. As shown in FIG. 4, the entrapment of PPO in nanoscintillation systems had little or no effect on the resulting particle size of the nanoparticles measured within 30 minutes after preparation.

Example 6

The feasibility of using the prototype nanoparticles containing PPO as an aqueous-based liquid scintillation counting system was demonstrated by adding 20 microliters of $^{14}$C-labeled sodium bicarbonate (NaH$^{14}$CO$_3$) to 3 mL samples and counting in a Packard 2200 CA Tri-Carb Liquid Scintillation Analyzer (see Table 2 below).

TABLE 2

Comparison of Prototype Aqueous-Based NanoScintillation Systems to Commercial Organic-Based Cocktails

| Sample | DPM Detected | % of Control #1 | % of Control #2 |
|---|---|---|---|
| Nanoparticles with PPO (1 mg/mL) in water | 2975 | 6.7% | 0.9% |
| Nanoparticles with PPO (1 mg/mL) in water with 1% phenoxyethanol | 4059 | 9.1% | 1.2% |
| Water (negative control) | 30 | 0.0% | 0.0% |
| Control #1: ScintiSafe Econo F (commercial cocktail) | 44,456 | 100.0% | N/A |
| Control #2: ScintiVerse LC (commercial cocktail) | 326,264 | N/A | 100.0% |

The results demonstrated that it was feasible to detect radioactivity added to the nanoscintillation system, although the efficiency of detection of $^{14}C$ was only ~1–10% of that obtained when using two commercially available organic-based cocktails. These commercial cocktails are highly optimized system containing PPO at a concentration of 5–7 mg/mL, emulsifying agents, and secondary fluor molecules such as bis-MSB and POPOP. The low efficiency observed with the initial nanoscintillation system employed is not surprising when one considers the materials of which the nanoparticles were composed (i.e., emulsifying wax and polyoxyethylene 20 stearyl ether. These materials might be expected to be chemical quenchers. Further, the energy spectra of the nanoscintillation system to which $^{14}C$-bicarbonate had been added were shifted toward the low-energy range. In addition, the nanoscintillation system contained only 1 mg/mL of PPO.

Example 7

Figure 5:
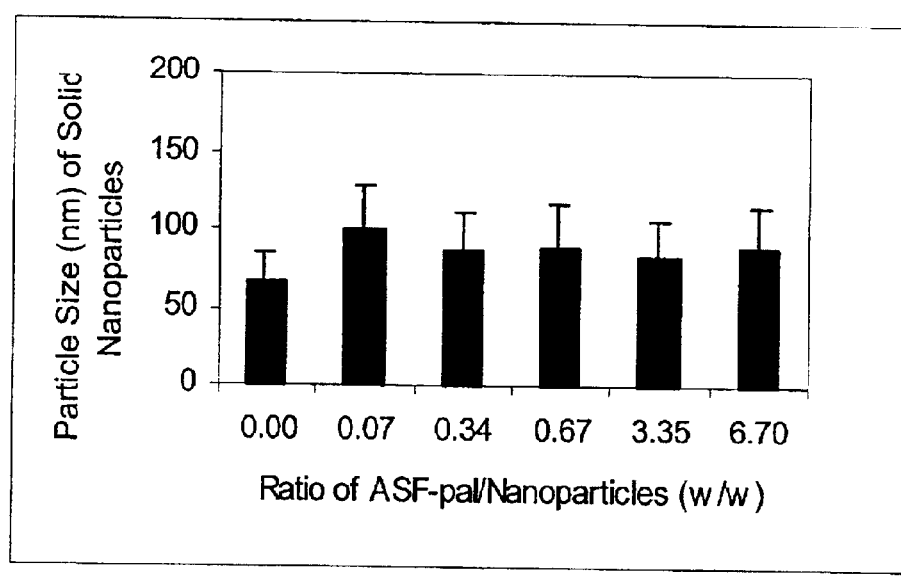
FIG. 5 Particle size of cured solid nanoparticles coated with different amounts of a ligand, asialofetuin-palmitate (ASF-pal).

To determine the feasibility of adding ligand to the cured solid nanoparticles, asialofetuin-palmitate (ASF-pal) was synthesized. Asialofetuin was derivatized with about 12 palmitate 'arms' per molecule as measured by a colorimetric hydroxamic acid reaction assay (Goddu, R. F., LeBlanc, N. F., Wright, C. M. Spectrophotometric determination of esters and anhydrides by hydroxamic acid reaction. Anal. Chem. 27:1251–1255, 1955) ASF-pal (1–100 µL; 13.4 µg/mL water) was added to cured solid nanoparticles in water so that the final concentration of nanoparticles was 200 µg nanoparticles per 1 mL. Stirring was continued at 25° C. for a total of 1 hour to ensure complete adsorption/insertion of the palmitate arm of ASF-pal into the nanoparticles. The results as shown in FIG. 5 demonstrate that even very high concentrations of ASF-pal could be added to the nanoparticles with only a small effect on the particle size. As controls, the particle size of ASF-pal alone in water at a concentration of either 67 µg/mL or 1340 µg/mL were measured. The results showed that ASF-pal formed micelles (3–15 nm) at 67 µg/mL At a concentration of 1340 µg/mL, ASF-pal formed a mixture of micelles (3–10 nm) as well as larger aggregates (40–300 nm). It was apparent from these results that a hydrophobized cell-specific targeting ligand could be added to cured nanoparticles.

Example 8

The formation of oil-in-water microemulsions using styrene as the oil phase: Microemulsions were formed using styrene as the oil phase, polyoxyethylene 20 stearyl ether as the surfactant, and 1-pentanol co-surfactant. The proportion of each component necessary for microemulsion formation was studied. The primary fluor molecule 2,5-diphenyloxazole (PPO) and secondary fluor molecule p-bis(o-methylstyryl)-benzene (bis-MSB) were dissolved in the styrene prior to microemulsion formation. After forming the microemulsion, the styrene was polymerized using sodium persulfate as a free radical initiator and heating to 70° C. for 8 hours to form a nanosuspension consisting of styrene nanoparticles entrapping PPO and bis-MSB.

The formula to prepare the nanoscintillation system was as follows
  80 mM polyoxyethylene 20 stearyl ether as surfactant
  2.5% (v/v) Styrene as oil phase
  5 mg/mL 2,5-diphenyloxazole (PPO) as primary fluor
  0.125 mg/mL p-bis(o-methylstyryl)benzene (bis-MSB) as secondary fluor
  224 mM 1-pentanol as co-surfactant
  1 mM sodium persulfate as free radical initiator
  Water as the continuous phase This nanosuspension was subsequently concentrated by a factor of ~2 using centrifugal ultrafiltration. Approximately 57,000 dpm of $^{14}C$-acetic acid (volume=50 µl) was then added to the nanosuspension and it was placed in a liquid scintillation counter. The number of radioactive counts (cpm) detected in the nanosuspension in the liquid scintillation counter was compared to the cpm obtained when the same amount of $^{14}C$-acetic acid was added to a conventional organic liquid scintillation cocktail and to water (as a control). The results of these counting experiments are as follows:

TABLE 3

Counting Efficiency of Nanosuspension as Compared to Conventional Organic Cocktail

| Sample (containing ~57,000 dpm of $^{14}C$-Acetic Acid | cpm | Efficiency Relative to Conventional Cocktail | Overall Counting Efficiency |
|---|---|---|---|
| Conventional LSC Cocktail | 50,814 | — | 89.1% |
| Water | 30 | 0.06% | 0.05% |
| Concentrated Nanosuspension | 14,632 | 28.8% | 25.7% |

Thus, the overall detection efficiency (counts per minute/disintegrations per minute) of the concentrated nanosuspension for detecting Carbon-14 was approximately 25.7%.

Figure 6:
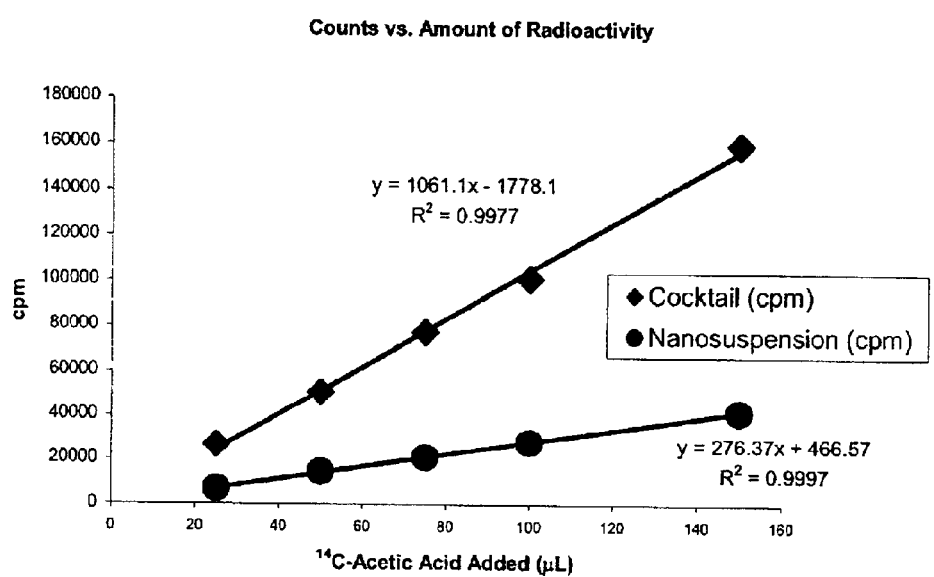
FIG. 6 The effect of nanoparticle concentration on the counting efficiency of a nanoscintillation system.

When increasing volumes of $^{14}C$-acetic acid (25–150 µL) were added to 3 mL of the nanosuspension, a linear increase in the number of cpm detected was observed as shown in FIG. 6 (and as summarized in Table 4 below).

TABLE 4

The Effect of Nanosuspension Concentration on the Counting Efficiency of Nanoscintillation Systems

| Volume of $^{14}C$-Acetic Acid Added* (µL) | Cocktail (cpm) | Nanosuspension (cpm) | Nonosuspension/Cocktail ratio |
|---|---|---|---|
| 25 | 26881 | 7086 | 0.264 |
| 50 | 50814 | 14632 | 0.288 |
| 75 | 77279 | 21266 | 0.275 |
| 100 | 100706 | 28025 | 0.278 |
| 150 | 159858 | 41870 | 0.262 |

*~1.14 × $10^6$ dpm/mL

Example 9

The Formation of Oil-in-water Microemulsions Using Increased Concentration of Styrene in the Oil Phase and Subsequent Formation of Nanosuspension:

The formula to prepare the nanoscintillation system was as follows
  80 mM polyoxyethylene 20 stearyl ether as surfactant
  5.0% (v/v) Styrene as oil phase
  10 mg/mL 2,5-diphenyloxazole (PPO) as primary fluor
  0.25 mg/mL p-bis(o-methylstyryl)benzene (bis-MSB) as secondary fluor
  224 mM 1-pentanol as co-surfactant
  1 mM sodium persulfate as free radical initiator
  Water as the continuous phase The microemulsion precursor was prepared by dissolving PPO and bis-MSB in styrene and added this to an aqueous solution containing polyoxyethylene 20 stearyl ether and pentanol. This mixture was heated to 45° C. for 15 minutes, cooled to room temperature and stirred for an additional 24 hours. To this clear microemulsion was added sodium persulfate to initiate the polymerization of styrene. The polymerization reaction continued for 8 hours at 70° C. The mean particle size of the resulting nanosuspension was 52.6 nm as determined by photon correlation spectroscopy.

This nanosuspension was subsequently concentrated by a factor of ~2 using centrifugal ultrafiltration. Approximately 91,000 dpm of $^{14}$C-acetic acid (volume 50=$\mu$l) was then added to the 1.0 mL of this nanosuspension and it was placed in a liquid scintillation counter. The number of radioactive counts (cpm) detected in the nanosuspension in the liquid scintillation counter was compared to the cpm obtained when the same amount of $^{14}$C-acetic acid was added to a conventional organic liquid scintillation cocktail and to water (as a control). The results of these counting experiments are as follows, summarized in Table 5:

TABLE 5

Counting Efficiency of Nanosuspension as Compared to Conventional Organic Cocktail

| Sample (containing ~91,000 dpm of $^{14}$C-Acetic Acid) | cpm | Efficiency Relative to Conventional Cocktail | Overall Counting Efficiency (cpm/dpm) |
| --- | --- | --- | --- |
| Conventional LSC Cocktail | 82,015 ± 242 | — | 90.1% |
| Concentrated Nano-suspension | 40,246 ± 706 | 49.1% | 44.2% |

With the benefit of the present disclosure, those having skill in the art will comprehend that techniques claimed herein and described above may be modified and applied to a number of additional, different applications, achieving the same or a similar result. The claims attached hereto cover all such modifications that fall within the scope and spirit of this disclosure. For example, although the description of this disclosure may name specific materials useful for the practice of the invention (e.g., specific materials useful as a surfactant or co-surfactant or fluor molecule), those of ordinary skill in the art having the benefit of this disclosure will recognize that any derivative thereof, any equivalent, or any other material achieving the same or similar result may be substituted therewith. Each of the following references is hereby incorporated by reference in its entirety:

References

Agostiano, A., Catalano, M., Curri, M. L., Della Monica, M., Manna, L., Vasanelli, L. Synthesis and structural characterisation of CdS nanoparticles prepared in a four-components "water-in-oil" microemulsion, *Micron*, 31:253–258, 2000.

Bhargava, H. N., Narurkar, A., Lieb, L. M. Using microemulsions for drug delivery. *Pharm. Tech.* March 46–53, 1987.

Bocca, C., Caputo, O., Cavalli, R., Gabriel, L., Miglietta, A., Gasco, M. R. Phagocytic uptake of fluorescent stealth and non-stealth solid lipid nanoparticles, *International Journal of Pharmaceutics*, 175: 185–193, 1998.

Capek, I. Microemulsion polymerization of styrene in the presence of anionic emulsifier, *Advances in Colloid and Interface Science*, 82: 253–273, 1999.

Cavalli, R., Peira, E., Caputo, O., Gasco, M. R. Solid lipid nanoparticles as carriers of hydrocortisone and progesterone complexes with cyclodextrins, *International Journal of Pharmaceutics*, 182:59–69, 1999.

Constantinides, P. P. Lipid microemulsions for improving drug dissolution and oral absorption: physical and biopharmaceutical aspects. *Pharm. Res.* 12:1561–1572, 1995.

Ewer, M. J., Harding, N. G. L. Micellar scintillators: A rational approach to the design of stable assay solvents for liquid scintillation counting. In: *Liquid Scintillation Counting*. Volume 3. Ed. M. A. Crook and P. Johnson. Heyden & Son. London. pp. 220–233, 1974.

Fang, J., Stokes, K. L., Wiemann, J., Zhou, W. Nanocrystalline bismuth synthesized via an in situ polymerization microemulsion process, *Materials Letters*, 2:113–120, 2000.

Goddu, R. F., LeBlanc, N. F., Wright, C. M. Spectrophotometric determination of esters and anhydrides by hydroxamic acid reaction. *Anal Chem.* 27:1251–1255, 1955.

Harrah, L. A., Powell, R. C. Dose rate saturation in plastic scintillators. In: *Organic Scintillators and Liquid Scintillation Counting*. Ed. D. L. Horrocks and C. T. Peng. Academic Press. New York. p. 266, 1971.

Hoar, T. P., Schulman, J. H. Transparent water-in-oil dispersions: the oleopathic hydro-micelle. *Nature*. 152:102–103, 1943.

Ho H. O., Hsiao, C. C., Sheu, M. T. Preparation of microemulsions using polyglycerol fatty acid esters as surfactant for the delivery of protein drugs. *J. Pharm. Sci.* 85:138–143, 1996.

Horrocks, D. L. In: *Applications of Liquid Scintillation Counting*. Academic Press. New York. p. 16, 1964.

Lade, M., Mays, H., Schmidt, J., Willumeit, R., Schomäcker, R. On the nanoparticle synthesis in microemulsions: detailed characterization of an applied reaction mixture, *Colloids and Surfaces A: Physicochemical and Engineering Aspects*, 163:3–15, 2000.

Li, Y., Park, C. W. Particle size distribution in the synthesis of nanoparticles using microemulsions, *Langmuir*, 15: 952–956, 1999.

Meier, W. Nanostructure synthesis using surfactants and copolymers, *Current Opinion in Colloid & Interface Science*, 4:6–14, 1999.

Munshi, N., De, T. K., Maitra, A. Preparation and size modulation of drug loaded nanoencapsulated particles using microemulsion mediated method, *Journal of Controlled Release*, 41:S7, 1997.

Myers, L. S., Brush, A. H. Counting of alpha and beta radiation in aqueous solutions by the detergent-anthracene scintillation method *Analyt. Chem.* 34:342–245, 1962.

Porta, F., Bifulco, C., Fermo, P., Bianchi, C. L., Fadoni, M., Prati, L. Synthesis of spherical nanoparticles of Cu2L2O5 (L=Ho, Er) from W/O microemulsions, *Colloids and Surfaces A: Physicochemical and Engineering Aspects*, 160:281–290, 1999.

Ruys, A. J., Mai, Y. W. The nanoparticle-coating process: a potential sol-gel route to homogeneous nanocomposites, *Materials Science and Engineering* 265:202–207, 1999.

Schram, E. Flow-monitoring of aqueous solutions containing weak β⁻-emitters. In: *The Current Status of liquid Scintillation Counting*. Ed. E. D. Bransome. Grune and Stratton. New York. pp. 95–109, 1970.

Song, K. C., Kang, Y. Preparation of high surface area tin oxide powders by a homogeneous precipitation method, *Materials Letters*, 42:283–289, 2000.

Steinberg, D. Radioassay of carbon-14 in aqueous solutions using a liquid scintillation spectrometer. *Nature*. 182:740–741, 1958.

Tang, Z., Liu, S., Wang, Z., Dong, S., Wang, E. Electrochemical synthesis of polyaniline nanoparticles, *Electrochemistry Communications*, 2:32–35, 2000.

Tojo, C., Blanco, M. C., Lopez-Quintela, M. A. Influence of reactant excess and film flexibility on the mechanism of nanoparticle formation in microemulsions: A Monte Carlo simulation, *Langmuir*, 14:6835–6839, 1998.

Xiangling, X., Xuewu, G., Qiang, Y., Zhicheng, Z., Ju, Z., Aizhen, N., Manwei, Z. Growth of polymer nanoparticles in microemulsion polymerization initiated with ray, *Radiation Physics and Chemistry*, 54: 279–283, 1999.

What is claimed is:

1. A nanoscintillation system comprising nanoparticles suspended in an aqueous vehicle, the nanoparticles comprising:
   at least one nanoparticle matrix material
   at least one surfactant or co-surfactant or a mixture thereof, and
   at least one primary or secondary fluor molecule or a mixture thereof.

2. The nanoscintillation system of claim 1, the nanoparticles having a diameter less than 300 nanometers.

3. The nanoscintillation system of claim 1, the nanoparticles having a diameter less than 100 nanometers.

4. The nanoscintillation system of claim 1, further comprising an electron-emitting or alpha-particle-emitting radioisotope.

5. The nanoscintillation system of claim 4, the electron-emitting or alpha-particle-emitting radioisotope being free or attached to one or more molecules in the aqueous vehicle.

6. The nanoscintillation system of claim 1, further comprising one or more ligands coupled to one or more of the nanoparticles.

7. The nanoscintillation system of claim 6, the one or more ligands comprising a protein, carbohydrate, or a combination thereof.

8. The nanoscintillation system of claim 1, the nanoparticle matrix material comprising emulsifying wax, a polyoxyethylene sorbitan fatty acid ester, a polyoxyethylene alkyl ether, a polyoxyethylene stearte, or polystyrene or its derivative or copolymer thereof.

9. The nanoscintillation system of claim 1, the nanoparticle matrix material being present at a concentration from 0.1 to 300 mg/mL.

10. The nanoscintillation system of claim 1, the aqueous vehicle comprising water or an aqueous buffer.

11. The nanoscintillation system of claim 1, the surfactant or co-surfactant comprising a polyoxyethylene alkyl ether, a polyoxyethylene sorbitan fatty acid ester, a polyoxyethylene stearate, an alkoxylated alcohol or its derivative thereof, or an alcohol.

12. The nanoscintillation system of claim 1, surfactants being present at a total concentration of 1–5000 mM.

13. The nanoscintillation system of claim 1, the primary fluor molecule comprising 2,5-diphenyloxazole (PPO), 2-(4-biphenylyl)-5-phenyl-1,3,4-oxadiazole (PBD), 2-(4-biphenylyl)-5-(4tert-butylphenyl)-1,3,4-oxadiazole (butyl-PBD), 2,5-bis(5-tert-butyl-2-benzoxazolyl)thiophene (BBOT), or derivatives or combinations thereof.

14. The nanoscintillation system of claim 1, the secondary fluor molecule comprising 1,4-bis(5-phenyloxazol-2yl)benzene (POPOP), 1,4-bis(2-methylstyryl)benzene(bis-MSB), or derivatives or combinations thereof.

15. The nanoscintillation system of claim 1, primary fluor molecules being present at a total concentration of at least 1 mg/mL.

16. The nanoscintillation system of claim 1, water comprising at least 50% of the total weight of the nanoscintillation system.

17. A method for scintillation measurement, comprising:
   obtaining a nanoscintillation system according to claim 1; and
   measuring scintillation associated with the nanoscintillation system.

18. A nanoparticle comprising:
   at least one nanoparticle matrix material;
   at least one surfactant or co-surfactant or a mixture thereof, and
   at least one primary or secondary fluor molecule or a mixture thereof;
   wherein the nanoparticle is made from an oil-in-water microemulsion precursor.

19. The nanoparticle of claim 18, the nanoparticle being made by cooling the oil-in-water microemulsion to room temperature while stirring.

20. The nanoparticle of claim 18, the nanoparticle comprising an emulsifying wax, a polyoxyethylene sorbitan fatty acid ester, a polyoxyethylene alkyl ether, a polyoxyethylene stearate, polystyrene, or derivatives or combinations thereof.

21. The nanoparticle of claim 18, the nanoparticle comprising polystyrene, a copolymer of polystyrene, or a derivative thereof and having a melting point between 40° C. and 80° C.

22. The nanoparticle of claim 18, the nanoparticle comprising styrene, divinyl benzene, toluene, an aromatic or unsaturated monomer capable of being polymerized by one or more free radicals, or a derivative or combination thereof.

23. The nanoparticle of claim 18, the nanoparticle being present at a concentration from 0.1 to 300 mg/mL.

24. The nanoparticle of claim 18, the surfactant or co-surfactant comprising a polyoxyethylene alkyl ether, a polyoxyethylene sorbitan fatty acid ester, a polyoxyethylene stearate, an alkoxylated alcohol or its derivative thereof, or an alcohol.

25. The nanoparticle of claim 18, surfactants being present at a total concentration of 1–5000 mM.

26. The nanoparticle of claim 25, surfactants being present at a total concentration of 1–300 mM.

27. The nanoparticle of claim 18, the primary fluor molecule comprising 2,5-diphenyloxazole (PPO), 2-(4-biphenylyl)-5-phenyl-1,3,4-oxadiazole (PBD), 2-(4-biphenylyl)-5-(4-tert-butylphenyl)-1,3,4-oxadiazole (butyl-PBD), 2,5-bis(5-tert-butyl-2-benzoxazolyl)thiophene (BBOT), or derivatives or combinations thereof.

28. The nanoparticle of claim 18, the secondary fluor molecule comprising 1,4-bis(5-phenyloxazol-2yl)benzene (POPOP), 1,4-bis(2-methylstyryl)benzene (bis-MSB), or derivatives or combinations thereof.

29. The nanoparticle of claim 18, primary fluor molecules being present at a total concentration of at least 1 mg/mL.

30. The nanoparticle of claim 18, the nanoparticle being made by polymerizing the nanoparticle matrix material within the oil-in-water microemulsion precursor by free-radical polymerization.

31. The nanoparticle of claim 30, free-radical polymerization being performed by heating the oil-in-water microemulsion precursor, by adding a free-radical initiator, or by a combination thereof.

32. A method for scintillation measurement, comprising:
   obtain a nanoparticle according to claim 18; and
   measuring scintillation associated with the nanoparticle.

33. A method of making a nanoscintillation system, comprising:
   dispersing a liquid nanoparticle matrix material with a fluor molecule in an aqueous continuous phase to form a surfactant stabilized microemulsion; and
   cooling the surfactant stabilized microemulsion to room temperature while stirring.

34. A method of making a nanoparticle useful for scintillation, comprising:
   obtaining a nanoparticle matrix material;
   melting the nanoparticle matrix material to form a liquid dispersed phase;
   dispersing a fluor molecule into the liquid dispersed phase;
   dispersing the liquid dispersed phase, including the fluor molecule, in an aqueous continuous phase to form a surfactant stabilized microemulsion; and
   cooling the microemulsion while stirring to form a solid stable nanoparticle having a diameter of less than about 300 nanometers, which includes the fluor molecule either entrapped in or adsorbed to the nanoparticle.

35. The method of claim 34, the melting occurring at a temperature between about 35° C. and about 100° C.

36. The method of claim 34, the cooling comprising cooling with no dilution in water.

37. A method of making a nanoscintillation system, comprising:
   dispersing a liquid nanoparticle matrix material with a fluor molecule in an aqueous continuous phase to form a surfactant stabilized microemulsion; and
   polymerizing the liquid nanoparticle matrix material by free-radical polymerization.

38. The method of claim 37, the free-radical polymerization being performed by heating the surfactant stabilized microemulsion, by adding a free-radical initiator, or by a combination thereof.

39. The method of claim 37, further comprising concentrating the nanoscintillation system.

40. The method of claim 39, the concentrating comprising centrifugal ultrafiltration.

* * * * *

UNITED STATES PATENT AND TRADEMARK OFFICE
CERTIFICATE OF CORRECTION

PATENT NO.    : 6,855,270 B2
DATED         : February 15, 2005
INVENTOR(S)   : Mumper et al.

It is certified that error appears in the above-identified patent and that said Letters Patent is hereby corrected as shown below:

Column 22,
Line 6, please delete "biphenylyl)-5-(4tert-butylphenyl)" and insert
-- biphenylyl)-5-(4-tert-butylphenyl) --.
Line 11, please delete "1,4-bis(2-methylstyryl)benzene(bis-" and insert -- 1,4-bis(2-methylstyryl)benzene (bis- --

Signed and Sealed this

Twelfth Day of July, 2005

JON W. DUDAS
*Director of the United States Patent and Trademark Office*